United States Patent
Bleyer et al.

(10) Patent No.: US 10,284,836 B2
(45) Date of Patent: May 7, 2019

(54) DEPTH CAMERA LIGHT LEAKAGE AVOIDANCE

(71) Applicant: Microsoft Technology Licensing, LLC, Redmond, WA (US)

(72) Inventors: Michael Bleyer, Seattle, WA (US); Raymond Kirk Price, Redmond, WA (US); Jian Zhao, Kenmore, WA (US); Denis Demandolx, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 72 days.

(21) Appl. No.: 15/428,078

(22) Filed: Feb. 8, 2017

(65) Prior Publication Data
US 2018/0227562 A1 Aug. 9, 2018

(51) Int. Cl.
*H04N 13/00* (2018.01)
*H04N 5/353* (2011.01)
(Continued)

(52) U.S. Cl.
CPC ......... *H04N 13/122* (2018.05); *H04N 5/3532* (2013.01); *H04N 13/246* (2018.05); *H04N 13/254* (2018.05); *H04N 13/271* (2018.05); *H04N 13/344* (2018.05); *H04N 2213/001* (2013.01)

(58) Field of Classification Search
None
See application file for complete search history.

(56) References Cited

U.S. PATENT DOCUMENTS

| 6,940,554 B2 | 9/2005 | Robins et al. |
| 7,935,994 B2 | 5/2011 | Wang et al. |

(Continued)

FOREIGN PATENT DOCUMENTS

| CA | 2855399 A1 | 1/2015 |
| KR | 20110048786 A | 5/2011 |
| WO | 2015183889 A1 | 12/2015 |

OTHER PUBLICATIONS

Hardesty, Larry, "Reflection-removing camera: Device uses depth sensor and signal processing to capture clear images through windows", Published on: Mar. 25, 2016 Available at: http://news.mit.edu/2016/reflection-removing-camera-0325.

(Continued)

*Primary Examiner* — Frederick D Bailey
(74) *Attorney, Agent, or Firm* — Arent Fox LLP

(57) ABSTRACT

Disclosed are a device and a method of depth sensing that handle light leakage issues. In some embodiments, the depth sensing device includes a light emitter that illuminates an environment of the depth sensing device. The device identifies a first portion of the emitted light that is prevented from reaching the environment of the device due to being redirected by an optical component located in proximity to the light emitter. An imaging sensor of the device detects a second portion of the emitted light that reaches and is reflected by a surface in the environment of the device other than a surface of the optical component. The device generates, based on the second portion of the emitted light, a depth map that includes a plurality of values corresponding to distances relative to the device, wherein said generating excludes from consideration the identified first portion of the emitted light.

20 Claims, 10 Drawing Sheets

(51) Int. Cl.
*H04N 13/122* (2018.01)
*H04N 13/246* (2018.01)
*H04N 13/254* (2018.01)
*H04N 13/344* (2018.01)
*H04N 13/271* (2018.01)

(56) References Cited

U.S. PATENT DOCUMENTS

| | | | |
|---|---|---|---|
| 7,973,977 B2 | 7/2011 | Thurston, III | |
| 8,576,306 B2 | 11/2013 | Kotani | |
| 8,659,749 B2 | 2/2014 | Bridges | |
| 8,797,439 B1* | 8/2014 | Coley | H04N 5/2258 348/222.1 |
| 9,330,464 B1 | 5/2016 | Ackerman et al. | |
| 9,538,162 B2* | 1/2017 | Choi | G01S 17/023 |
| 9,906,793 B2* | 2/2018 | Fu | G06T 5/005 |
| 2002/0060753 A1* | 5/2002 | Flint | H04N 5/7416 348/744 |
| 2005/0068452 A1 | 3/2005 | Steinberg et al. | |
| 2010/0033776 A1* | 2/2010 | Klassen | H04N 1/401 358/509 |
| 2010/0231774 A1 | 9/2010 | Tashiro | |
| 2011/0025827 A1* | 2/2011 | Shpunt | H04N 13/0239 348/47 |
| 2012/0262553 A1* | 10/2012 | Chen | G01B 11/25 348/47 |
| 2012/0320159 A1 | 12/2012 | Torres et al. | |
| 2015/0009296 A1 | 1/2015 | Crona | |
| 2015/0229912 A1* | 8/2015 | Masalkar | G01S 7/481 348/46 |
| 2015/0245008 A1* | 8/2015 | Hyodo | H04N 13/0037 382/154 |
| 2015/0370071 A1* | 12/2015 | Alton | G02B 27/0172 349/11 |
| 2017/0158130 A1* | 6/2017 | Patil | B60Q 11/005 |
| 2018/0063508 A1* | 3/2018 | Trail | G06T 19/006 |
| 2018/0106891 A1* | 4/2018 | Thurner | G01S 17/89 |
| 2018/0149776 A1* | 5/2018 | Nalla | G02B 5/003 |

OTHER PUBLICATIONS

Schuon, et al., "High-Quality Scanning Using Time-Of-Flight Depth Superresolution", In Proceedings of IEEE Conference on Computer Vision and Pattern Recognition, Jun. 23, 2008, 7 pages.

* cited by examiner

DEPTH CAMERA LIGHT LEAKAGE AVOIDANCE

BACKGROUND

Depth sensing technology can be used to determine a person's location in relation to nearby objects or to generate an image of a person's immediate environment in three dimensions (3D). One application in which depth (distance) sensing technology may be used is in head-mounted display (HMD) devices and other types of near-eye display (NED) devices. Depth sensing technology can employ a time-of-flight (ToF) depth camera. With ToF based depth sensing technology, a light source emits light into its nearby environment, and a ToF camera captures the light after it reflects off nearby objects. The time taken for the light to travel from the light source and to reflect back from an object to the ToF camera is converted, based on the known speed of light, into a depth measurement (i.e., the distance to the object). Such a measurement can be processed with other similar measurements to create a map of physical surfaces in the user's environment (called a depth image or depth map) and, if desired, to render a 3D image of the user's environment.

SUMMARY

Introduced here are a device and a method (collectively and individually, "the technique introduced here") of depth sensing. In some embodiments, the depth sensing device includes a light emitter (also referred to as illumination module) and an imaging sensor. The light emitter illuminates an environment of the depth sensing device. The depth sensing device identifies a first portion of the emitted light that is prevented from reaching the environment of the depth sensing device due to being redirected by an optical component located in proximity to the light emitter. An imaging sensor of the depth sensing device detects a second portion of the emitted light that reaches and is reflected by a surface in the environment of the depth sensing device other than a surface of the optical component. The depth sensing device generates, based on the second portion of the emitted light, a depth map that includes a plurality of values corresponding to distances relative to the depth sensing device, wherein said generating excludes from consideration the identified first portion of the emitted light.

In some embodiments, the depth sensing device includes an illumination module, an optical component located in proximity to the illumination module, an imaging sensor, and a process. The illumination module emits light. A first portion of the emitted light illuminates an environment of the depth sensing device. The optical component redirects and prevents a second portion of the emitted light from reaching the environment of the depth sensing device. The imaging sensor receives the first and second portions of the emitted light and records an image based on the received light. The processor generates a processed image by subtracting a light leakage mask from the recorded image. The light leakage mask includes pixel values corresponding to the second portion of the emitted light that is prevented from reaching the environment of the depth sensing device due to being redirected by the optical component. The processor converts the processed image into a depth map that includes a plurality of pixel values corresponding to depths of the environment relative to the depth sensing device In some embodiments, the depth sensing device includes an optical component, an illumination module, and an imaging sensor. The illumination module is located in proximity to the optical component. The illumination module emits light towards an environment of the depth sensing device. A first portion of the emitted light is prevented from reaching the environment due to being redirected by the optical component. A second portion of the emitted light illuminates the environment and is reflected through the optical component by a surface in the environment other than a surface of the optical component. The imagining sensor includes a shutter. The shutter closes during a first time period when the first portion of the emitted light redirected by the optical component is reaching the shutter. The shutter opens during a second time period when the imaging sensor receives through the optical component the second portion of the emitted light reflected by the surface of the environment. In some other embodiments, the shutter is not completely closed but is substantially closed, during which a substantially reduced portion of the first portion of the emitted light reaches the shutter.

Other aspects of the disclosed embodiments will be apparent from the accompanying figures and detailed description.

This Summary is provided to introduce a selection of concepts in a simplified form that are further explained below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
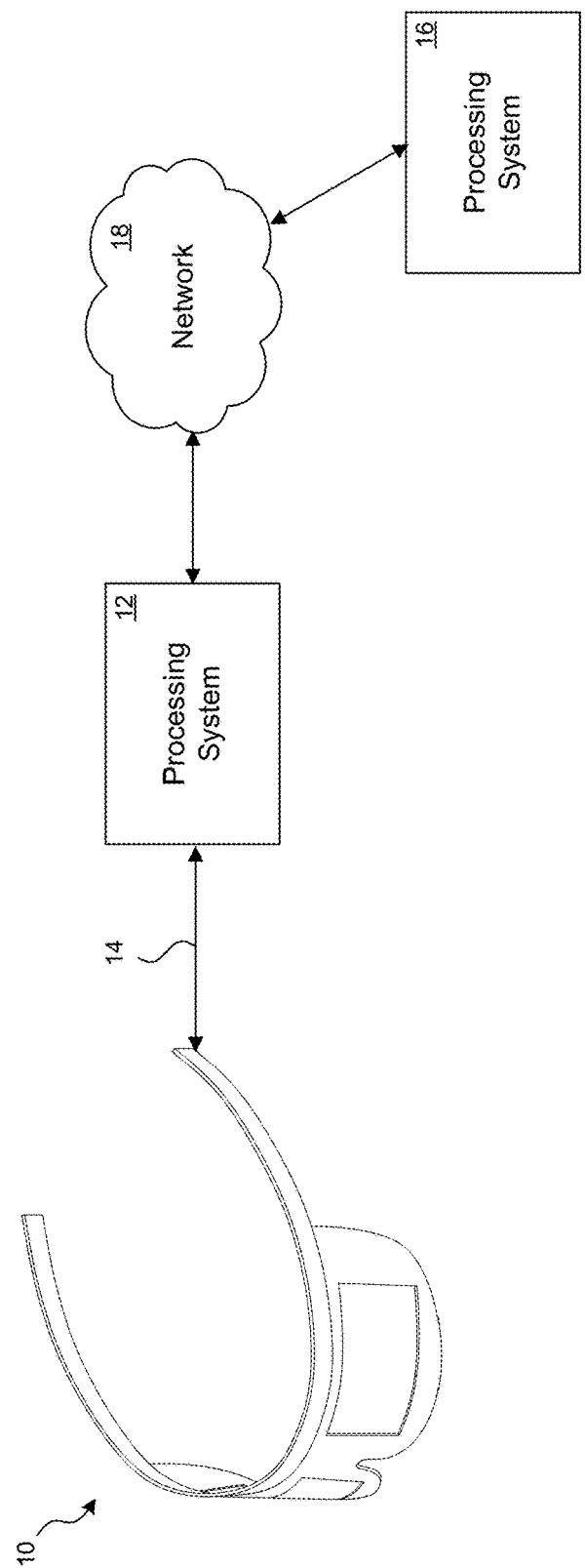
FIG. 1 shows an example of an environment in which a virtual reality (VR) or augmented reality (AR) enabled HMD device can be used.

In this description, references to "an embodiment," "one embodiment" or the like mean that the particular feature, function, structure or characteristic being described is included in at least one embodiment introduced here. Occurrences of such phrases in this specification do not necessarily all refer to the same embodiment. On the other hand, the embodiments referred to also are not necessarily mutually exclusive.

Some depth sensing devices such as HMD devices and other types of NED devices include depth cameras to detect depth information relating to objects in the environment in which the device is located. The depth sensing device can include an illumination module (e.g., an LED or a laser) that actively casts light into the environment of the device. With the illumination module, the depth sensing device is also called an active depth sensing device, and the depth camera is also called active depth camera. One type of active depth cameras is a ToF camera.

The depth sensing device can further include a protective optical component (e.g., a visor or a transparent shield) that is placed in front of the depth camera, such as used in some HMD devices. The protective optical component protects the depth camera from physical damage. A depth sensing device with such an optical component can also be visually more appealing to consumers. However, such a protective optical component tends to create a light leakage problem for the depth camera, which is due to unintended light redirection by the optical component.

For example, the illumination module is designed to emit light that illuminates the environment. The environment reflects the light and the depth camera receives at least some of the reflected light for depth sensing. However, due to manufacturing imperfection of the protective optical component or foreign objects (e.g., dust, a smudge or fingerprint) on the optical component, the optical component redirects a portion of the emitted light back to the imaging sensor of the depth camera. In other words, the optical component prevents that portion of the emitted light (also referred to as leaked light) from reaching the environment. This phenomenon of light redirection due to the protective optical component is called light leakage.

The leaked light is redirected by the optical component and does not reach the environment. As a result, the leaked light corresponds to depth values of the optical component instead of the environment. Since the imaging sensor of the depth camera receives both the leaked light and the light reflected by a surface of the environment, the resulting calculated depth values correspond to points that are between the optical component and the environment. In other words, some of the measured depth values no longer accurately represent the distances between the environment and the depth sensing device.

To address the light leakage issue, the depth sensing device identifies a first portion of the emitted light that is prevented from reaching the environment of the depth sensing device due to being redirected by the optical component, and a second portion of the emitted light that reaches and is reflected by the surface of the environment of the depth sensing device. The imaging sensor of the depth sensing device generates based on the second portion of the emitted light a depth map, which includes values corresponding to distances relative to the depth sensing device. The generation of the depth map excludes from consideration the identified first portion of the emitted light, and therefore prevents inaccurate depth measurement due to the light leakage.

To achieve accurate depth readings, the first and second portions of the emitted light can be identified in various ways. In some embodiments, the depth sensing device includes an electronic shutter that opens only when the second portion of the emitted light reaches the imaging sensor. In some other embodiments, the depth sensing device generates a light leakage mask and subtracts the light leakage mask from the depth map.

FIGS. 1 through 10 and related text describe certain embodiments of a technology for depth sensing. However, the disclosed embodiments are not limited to NED systems or HMD devices and have a variety of possible applications, such as in computer monitor systems, head-up display (HUD) systems, self-driving automobile systems, information input systems, and video game systems. All such applications, improvements, or modifications are considered within the scope of the concepts disclosed here.

HMD Device Hardware

FIG. 1 schematically shows an example of an environment in which an HMD device can be used. In the illustrated example, the HMD device 10 is configured to communicate data to and from an external processing system 12 through a connection 14, which can be a wired connection, a wireless connection, or a combination thereof. In other use cases, however, the HMD device 10 may operate as a standalone device. The connection 14 can be configured to carry any kind of data, such as image data (e.g., still images and/or full-motion video, including 2D and 3D images), audio, multimedia, voice, and/or any other type(s) of data. The processing system 12 may be, for example, a game console, personal computer, tablet computer, smartphone, or other type of processing device. The connection 14 can be, for example, a universal serial bus (USB) connection, Wi-Fi connection, Bluetooth or Bluetooth Low Energy (BLE) connection, Ethernet connection, cable connection, digital subscriber line (DSL) connection, cellular connection (e.g., 3G, LTE/4G or 5G), or the like, or a combination thereof. Additionally, the processing system 12 may communicate with one or more other processing systems 16 via a network 18, which may be or include, for example, a local area network (LAN), a wide area network (WAN), an intranet, a metropolitan area network (MAN), the global Internet, or combinations thereof.

Figure 2:
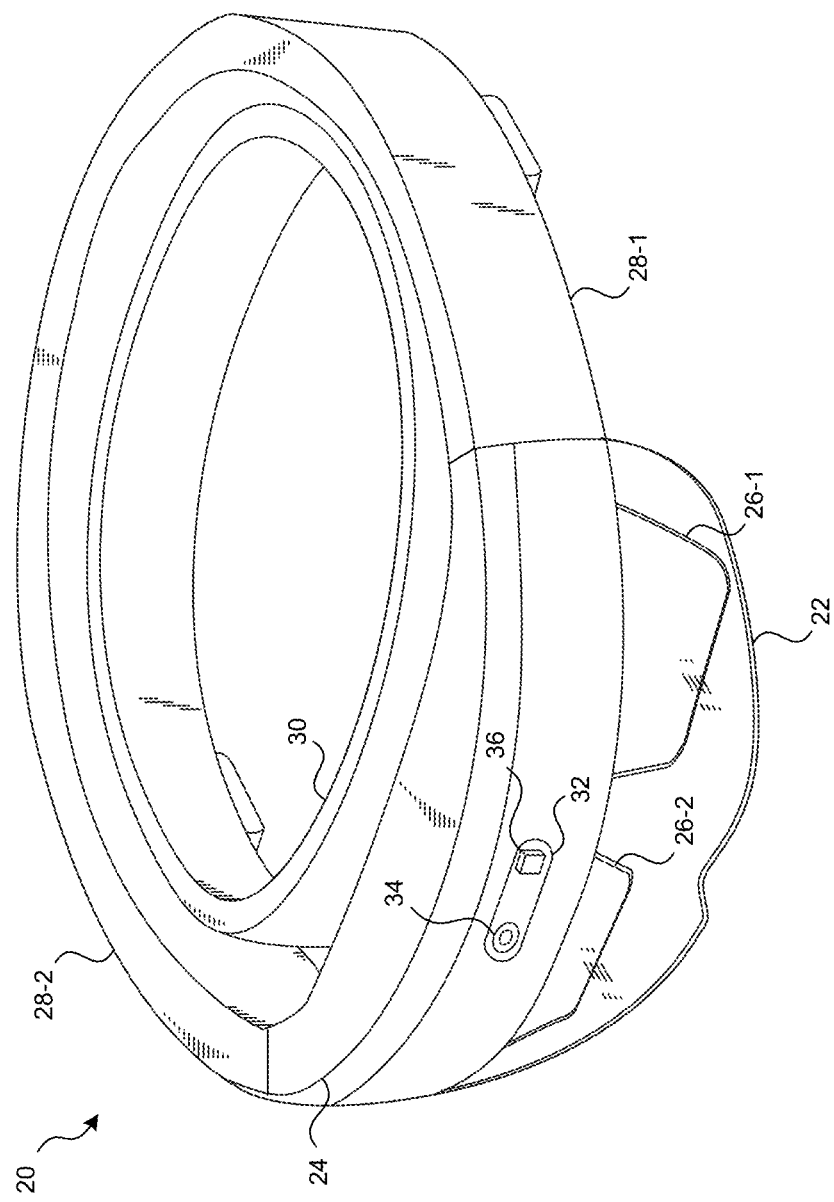
FIG. 2 illustrates a perspective view of an example of an HMD device.

FIG. 2 shows a perspective view of an HMD device 20 that can incorporate the features being introduced here, according to certain embodiments. The HMD device 20 can be an embodiment of the HMD device 10 of FIG. 1. The HMD device 20 has a protective sealed visor assembly 22 (hereafter the "visor assembly 22") that includes a chassis 24. The chassis 24 is the structural component by which display elements, optics, sensors and electronics are coupled to the rest of the HMD device 20. The chassis 24 can be formed of molded plastic, lightweight metal alloy, or polymer, for example.

The visor assembly 22 includes left and right AR displays 26-1 and 26-2, respectively. The AR displays 26-1 and 26-2 are configured to display images overlaid on the user's view of the real-world environment, for example, by projecting light into the user's eyes. Left and right side arms 28-1 and 28-2, respectively, are structures that attach to the chassis 24 at the left and right open ends of the chassis 24, respectively, via flexible or rigid fastening mechanisms (including one or more clamps, hinges, etc.). The HMD device 20 includes an adjustable headband (or other type of head fitting) 30, attached to the side arms 28-1 and 28-2, by which the HMD device 20 can be worn on the user's head.

The chassis 24 may include various fixtures (e.g., screw holes, raised flat surfaces, etc.) to which a sensor assembly 32 and other components can be attached. In some embodiments the sensor assembly 32 is contained within the visor assembly 22 and mounted to an interior surface of the chassis 24 via a lightweight metal frame (not shown). A circuit board (not shown in FIG. 2) bearing electronics components of the HMD 20 (e.g., microprocessor, memory) can also be mounted to the chassis 24 within the visor assembly 22.

The sensor assembly 32 includes a depth camera 34 and an illumination module 36 of a depth imaging system. The illumination module 36 emits light to illuminate a scene. Some of the light reflects off surfaces of objects in the scene, and returns back to the imaging camera 34. In some embodiments such as an active stereo system, the assembly can include two or more cameras. In some embodiments, the illumination modules 36 and the depth cameras 34 can be separate units that are connected by a flexible printed circuit or other data communication interfaces. The depth camera 34 captures the reflected light that includes at least a portion of the light from the illumination module 36.

The "light" emitted from the illumination module 36 is electromagnetic radiation suitable for depth sensing and should not directly interfere with the user's view of the real world. As such, the light emitted from the illumination module 36 is typically not part of the human-visible spectrum. Examples of the emitted light include infrared (IR) light to make the illumination unobtrusive. Sources of the light emitted by the illumination module 36 may include LEDs such as super-luminescent LEDs, laser diodes, or any other semiconductor-based light source with sufficient power output.

The depth camera 34 may be or include any imaging sensor configured to capture light emitted by an illumination module 36. The depth camera 34 may include a lens that gathers reflected light and images the environment onto the imaging sensor. An optical bandpass filter may be used to pass only the light with the same wavelength as the light emitted by the illumination module 36. For example, in a structured light depth imaging system, each pixel of the depth camera 34 may use triangulation to determine the distance to objects in the scene. Any of various approaches known to persons skilled in the art can be used for making the corresponding depth calculations.

The HMD device 20 includes electronics circuitry (not shown in FIG. 2) to control the operations of the depth camera 34 and the illumination module 36, and to perform associated data processing functions. The circuitry may include, for example, one or more processors and one or more memories. As a result, the HMD device 20 can provide surface reconstruction to model the user's environment, or can be used as a sensor to receive human interaction information. With such a configuration, images generated by the HMD device 20 can be properly overlaid on the user's 3D view of the real world to provide a so-called augmented reality. Note that in other embodiments the aforementioned components may be located in different locations on the HMD device 20. Additionally, some embodiments may omit some of the aforementioned components and/or may include additional components not discussed above nor shown in FIG. 2. In some alternative embodiments, the aforementioned depth imaging system can be included in devices that are not HMD devices. For example, depth imaging systems can be used in motion sensing input devices for computers or game consoles, automotive sensing devices, earth topography detectors, robots, etc.

Figure 3:
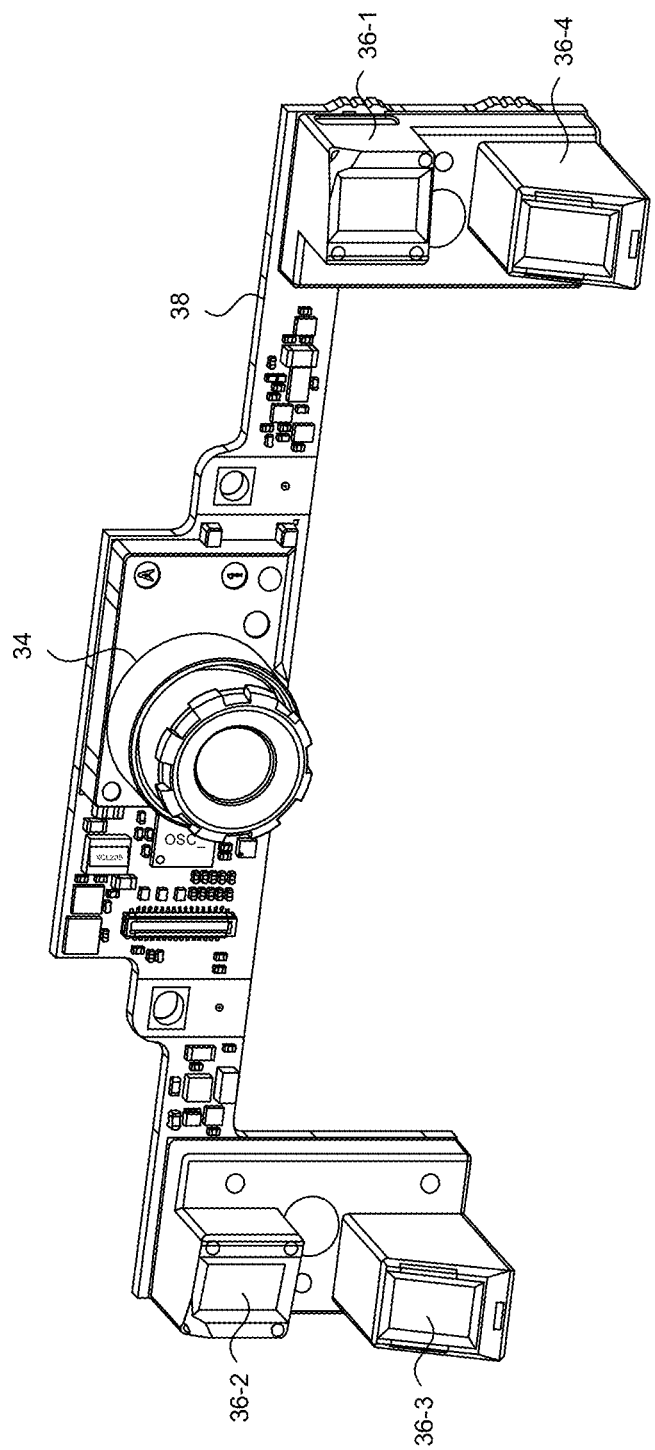
FIG. 3 shows a front view of a portion of a sensor assembly of an HMD device.

FIG. 3 shows a portion of the sensor assembly 32 of the HMD device 20, according to at least one embodiment. In particular, the sensor assembly 32 includes sensors and electronics mounted to a circuit board 38, which can be mounted to the chassis 24 as mentioned above. The sensors mounted to the circuit board 38 include the depth camera 34 and the illumination modules 36-1 through 36-4. Other sensors that may be included in the sensor assembly 32 but are not shown in the figures or discussed further may include head-tracking cameras, visible spectrum cameras, ambient light sensors, and the like. Some or all of these other sensors may also be mounted to the sensor assembly 32.

In the illustrated embodiment, illumination modules 36-1 and 36-2 are positioned such that they emit light in slightly outwardly divergent directions with respect to the depth camera 34; whereas illumination modules 36-3 and 36-4 are positioned such that they emit light directly forward (i.e., parallel to the user's head-pointing vector). Moreover, illumination from illumination modules 36-3 and 36-4 has a reduced field of illumination and increased range from the depth camera 34 that is greater than the range of illumination from illumination modules 36-1 and 36-2 from the depth camera 34. Hence, illumination modules 36 are collectively configured to illuminate the user's field of view, although the illumination may not be visible to the user. The locations and positions of the illumination modules 36 and the depth camera 34 relative to each other as shown in FIG. 3 are merely examples of a configuration used for depth sensing; other configurations are possible in the context of the technique introduced here.

Light Leakage Due to Protective Optical Component

Figure 4B:
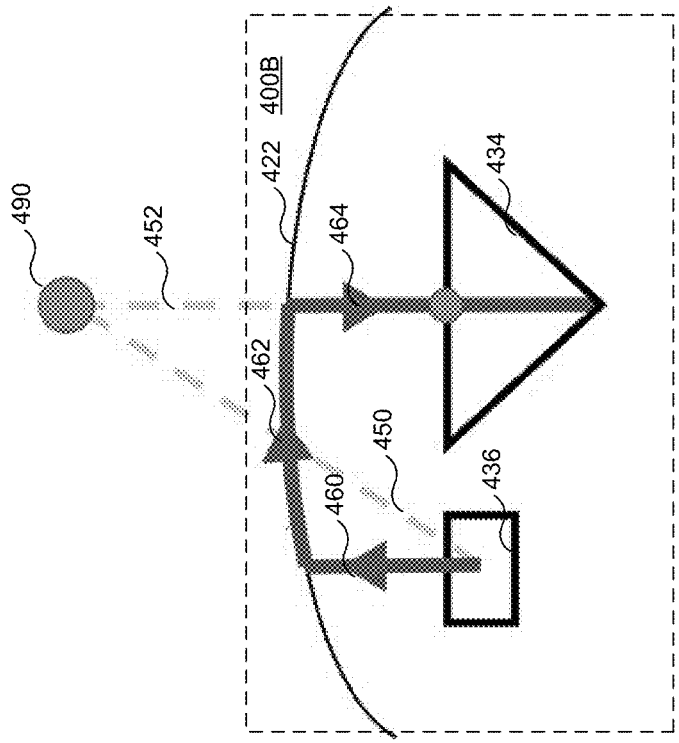
FIG. 4B schematically illustrates an active depth sensing device with a protective optical component.
Figure 4A:
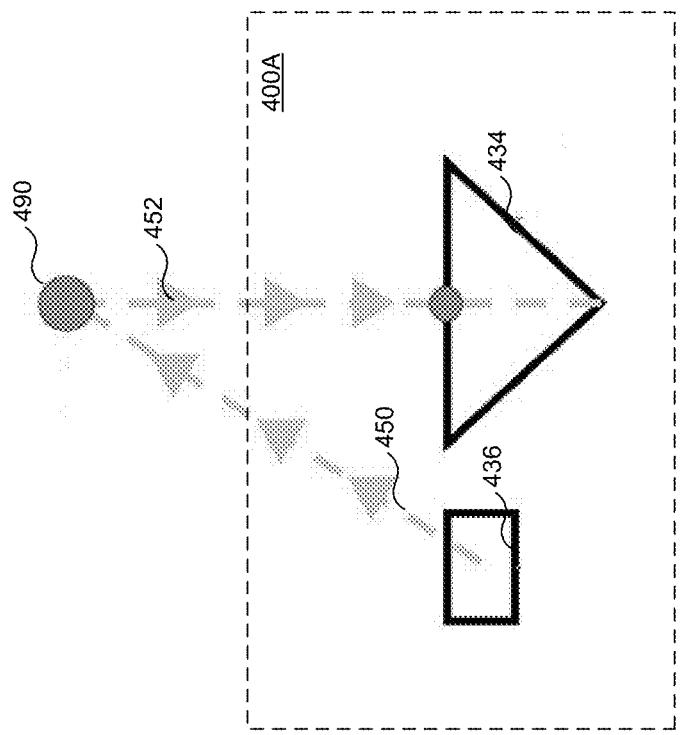
FIG. 4A schematically illustrates an active depth sensing device without a protective optical component.

FIG. 4A illustrates an active depth sensing device without a protective optical component. The active depth sensing device 400A (e.g., HMD device 20) includes an illumination module 436 (e.g., an LED or a laser) and a depth camera 434. There is no protective optical component (e.g., a visor) in front of the depth camera 434. The illumination module 436 emits a light beam 450 towards a point 490 of the environment. The point 490 reflects the light (as light beam 452) towards the depth camera 434.

The depth camera 434 captures the light beam 452 and determines the time taken for the light to travel from the illumination module 436 to the point 490 and the time taken to travel from the point 490 to the depth camera 434. The depth sensing device 400A converts the total time into a depth measurement as the relative distance to the point 490.

FIG. 4B illustrates an active depth sensing device with a protective optical component. The active depth sensing device 400B (e.g., HMD device 20) includes an illumination module 436 (e.g., an LED or a laser), a depth camera 434 and a protective optical component 422 (e.g., visor 22) in front of the depth camera 434. The illumination module 436 is located in proximity to the optical component 422. In some embodiments, the distance between the illumination module 436 and the optical component 422 is in the range of few millimeters (mm) to a few (e.g., 1-3) centimeters (cm), although in other embodiments that distance can be larger, and perhaps significantly larger The illumination module 436 emits a light beam 450 towards a point 490 of the environment through the optical component 422. The point 490 reflects the light (as light beam 452) towards the depth camera 434 through the optical component 422.

However, there can be natural scattering from the optical component or manufacturing imperfections in the optical component 422 or foreign objects (e.g., dust, a smudge or fingerprint) on the optical component 422. Due to the imperfections or foreign objects, the optical component 422 can operate as a waveguide and change the direction (i.e., redirect) of a portion of the emitted light. For example, the illumination module 426 emits a light beam 460 towards the optical component 422. The optical component 422, as a waveguide, receives the light beam 460 and guides the light to travel in the optical component 422 as light beam 462. Then the optical component 422 redirects the light towards the depth camera 434 as light beam 464.

The portion of emitted light that travels as light beams 460, 462 and 464 is called leaked light. Since the optical component 422 prevents the leaked light from reaching the environment, the leaked light only reaches the optical component 422 and is redirected to the depth camera 434.

The depth camera 434 receives the light beam 452 reflected by the environment point 490 (which is a point on a surface of the environment), as well as the light beam 464 redirected by the optical component 422. The total light travel time of the light beams 450 and 452 corresponds to a distance between the environment point 490 and the depth camera 434. In contrast, the total light travel time of the light beams 460, 462 and 464 corresponds to a distance between the optical component 422 and the depth camera 434.

As a result, by measuring the depth based on a combination of the light beams 452 and 464, the depth value measured by the depth camera 434 deviates from the actual distance of the environment point 490. The deviation is called depth error. The resulting depth value is between the distance of the environment point 490 and the distance of the optical component 422. In other words, the leaked light due to the optical component 422 causes an inaccurate depth measurement. The 3D reconstruction of the environment based on the depth map is therefore distorted.

The depth error also depends on the reflectivity of the environment. For example, if the environment point 490 has a relatively high reflectivity, the depth camera 434 receives more photons from the light beam 452, which corresponds to the correct depth value. Thus, the effect of depth error due to the light beam 464 is relatively low. On the other hand, if the environment point 490 has a relatively low reflectivity, the depth camera 434 receives less photons from the light beam 452, which corresponds to the correct depth value. Thus, the effect of depth error due to the light beam 464 is relatively high. Since the environment can have portions having different reflectivity levels, the depth error due to the optical component 422 cannot be estimated simply as corresponding to a constant percentage of the total received light intensity.

Reduction of Depth Error Based on a Light Leakage Mask

To reduce or eliminate the depth error caused by the light leakage from the optical component, in some embodiments, the depth sensing device generates a light leakage mask and adjusts the depth map by subtracting the light leakage mask from the depth map. The light leakage mask includes pixel values corresponding to light that is prevented from reaching the environment of the depth sensing device due to being redirected by the optical component.

As shown in FIG. 4B, the depth camera receives light signals from two different light paths. A first portion of the received light is redirected by the optical component (e.g., visor) and corresponds to the depth error. A second portion of the received light is reflected by a surface of an object whose depth is to be measured, e.g., a point of the environment of the depth camera. The light signals of the second portion change when the depth sensing device or the object moves. In contrast, the light signals of the first portion (also referred to as light leakage signals) remain constant when the depth sensing device or the object moves, because the distance between the depth camera and the optical component remains fixed.

The imaging sensor of the depth sensing device can record the light leakage signals collectively as an image called light leakage mask. Because the light leakage mask remains constant, the depth sensing device can subtract the light leakage mask from a recorded image to derive a processed image. The recorded image includes light signals from both the first and second portions of the received light signals, while the processed image only includes light signals from the second portion of the light reflected by the surface of the object to be measured.

The depth sensing device then converts the processed image into a depth map, which includes depth pixel values corresponding to distances of the object or the environment, without depth error due to the light leakage.

The light leakage mask can be applied to various types of depth sensing systems. For example, the light leakage mask can be applied to a pulse-based time-of-flight depth camera, a phase-based time-of-flight depth camera, or a structured light stereo matching system.

In the case of pulse-based ToF depth camera, the inaccurate depth values due to the light leakage are always smaller than the correct depth values. In other words, the depth errors are always negative for pulse-based ToF depth camera. The reason is that the total travel time for the light redirected by the optical component is smaller than the total travel time for the light reflected by a surface of the environment.

In a phase-based ToF depth camera, the illumination module (e.g., laser) and the shutter are frequency-modulated. The depth information is reconstructed by computing the phase difference between the corresponding emitted and received light signals. For the phase-based ToF depth camera, the depth errors can be either negative or positive, because the light leakage can cause the phase to shift either forward or backward. For example, a depth map for even a flat wall in the environment can include sinusoidal ripples due the light leakage. Furthermore, if the light leakage is sufficiently strong, additional depth errors can occur during a dealiasing process, during which results of multiple frequency measurements are compared to extract the depth information. Similar to the pulse-based ToF depth camera, the light leakage mask can help eliminate or reduce the depth error due to the light leakage in phase-based ToF depth camera as well.

The structured light stereo matching system can also use the light leakage mask for achieving accurate depth measurement. The structured light stereo matching system uses structured light pattern to measure depth via triangulation. The system performs stereo matching between the captured camera image and a virtual image that corresponds to the structured light pattern of the illumination module. If the captured camera image is contaminated by the depth error due to the light leakage, those two images are more dissimilar from each other. As a result, the stereo matching process more likely produces inaccurate matches, leading to inaccurate depth values. By subtracting the light leakage mask from the captured camera image, the stereo matching between the captured image (after the subtraction) and the virtual image results in more accurate depth values.

Generation of Light Leakage Mask During Camera Calibration

In some embodiments, the light leakage mask can be generated offline, e.g., during camera calibration, since the light leakage mask is constant and does not depend on movement of the depth sensing device or movement of the object to be measured. For example, the light leakage mask can be generated during a camera calibration process when the depth sensing device is manufactured and calibrated.

Figure 5:
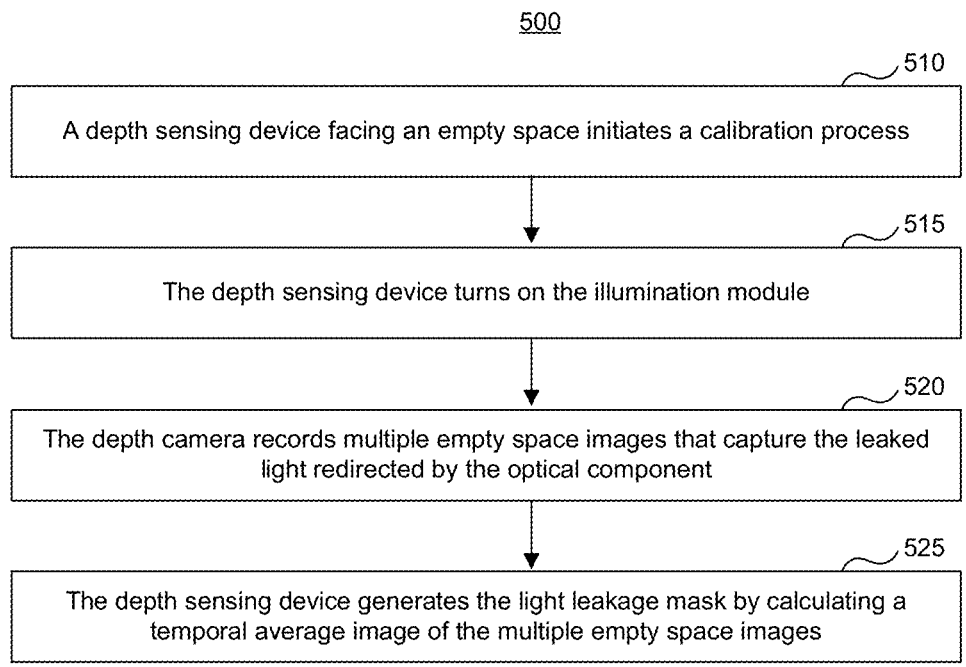
FIG. 5 is a flow diagram illustrating a sample process of generating a light leakage mask during camera calibration.

FIG. 5 illustrates a sample process of generating a light leakage mask during camera calibration. At step 510 of the process 500, the depth sensing device (including the illumination module, the depth camera and the optical component) facing an empty space initiates a calibration process. Here an empty space refers to a space where the environment is sufficiently far from the depth camera such that the depth camera does not receive a meaningful amount of light signals that are emitted by the illumination module and reflected by a surface of the environment. Furthermore, there is no ambient light in the empty space.

An instance of the empty space is a night sky without any stars or moon. In some embodiments, the empty space can be set up such that there is enough space between the depth sensing device and a wall. The wall has a low reflectivity such that the depth camera only receives a negligible amount of light signals that are emitted by the illumination module and reflected by a surface of the wall. Ambient light sources (e.g., window or lamp) are also avoided or switched off.

At step 515, the depth sensing device turns on the illumination module. Since the depth camera does not receive any light signals that are reflected by the surface of the environment, the only light signals that the depth camera receives are the light signals that are emitted by the illumination module and redirected by the optical component.

At step 520, the depth camera records multiple empty space images that capture the leaked light redirected by the optical component. At step 525, the depth sensing device generates the light leakage mask by calculating a temporal average image of the multiple empty space images. The advantage of calculating an average of multiple empty space images is to eliminate the photon noise from the light leakage mask.

Real-Time Generation of Light Leakage Mask

Instead of generating the light leakage mask during camera calibration, the depth sensing device can also generate the light leakage mask while the depth sensing device is operating (on-the-fly). The assumption is that the depth camera and/or the object to be measured (i.e., environment) are moving such that each pixel of the depth camera observes an empty space at least at certain time points. One advantage of generating the light leakage mask on-the-fly over generating the mask during camera calibration is that the on-the-fly generation of the light leakage mask takes into consideration any changes to the optical component after the system is calibrated. For example, the light leakage mask generated on-the-fly can capture effect of fingerprint contamination on the visor (or other types of optical components), on which a user's hand causes the fingerprint.

Figure 6:
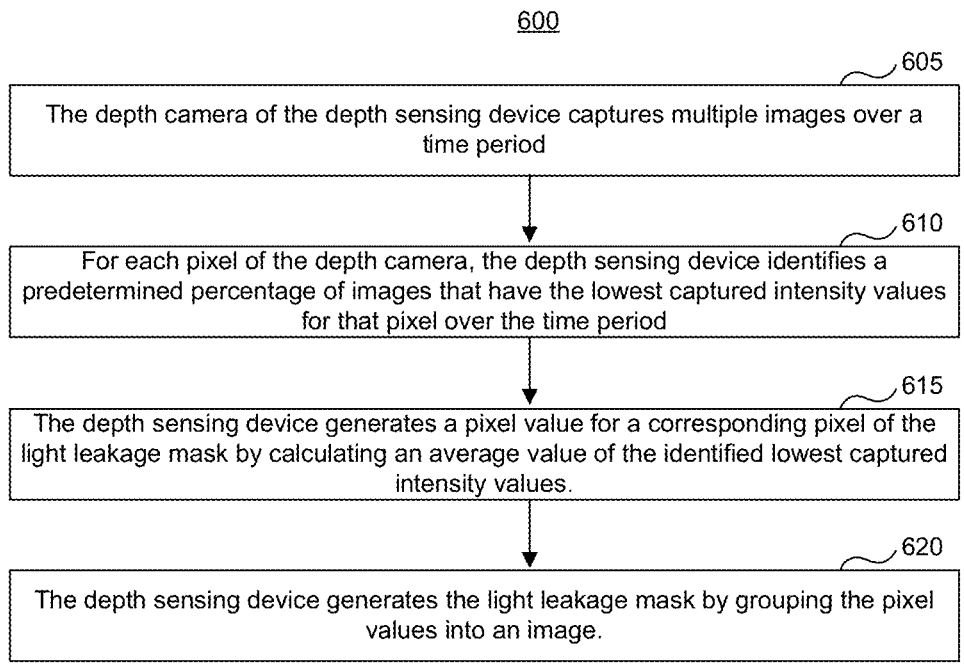
FIG. 6 is a flow diagram illustrating a sample process of generating a light leakage mask on-the-fly.

FIG. 6 illustrates a sample process of generating a light leakage mask on-the-fly. For the process 600, the assumption is that the each pixel of a moving depth camera observes empty space for at least a predetermined percentage (e.g., 5%) of the time. At step 605 of the process 600, the depth camera of the depth sensing device captures multiple images over a time period. At step 610, for each pixel of the depth camera, the depth sensing device identifies a predetermined percentage (e.g., 5%) of images that have the lowest captured intensity values (also referred to as responses) for that pixel over the time period.

At step 615, the depth sensing device generates a pixel value for a corresponding pixel of the light leakage mask by calculating an average value of the identified lowest captured intensity values. The purpose of averaging is to illuminate the photo noise for that pixel. At step 620, the depth sensing device generates the light leakage mask by grouping the pixel values into an image.

Figure 7:
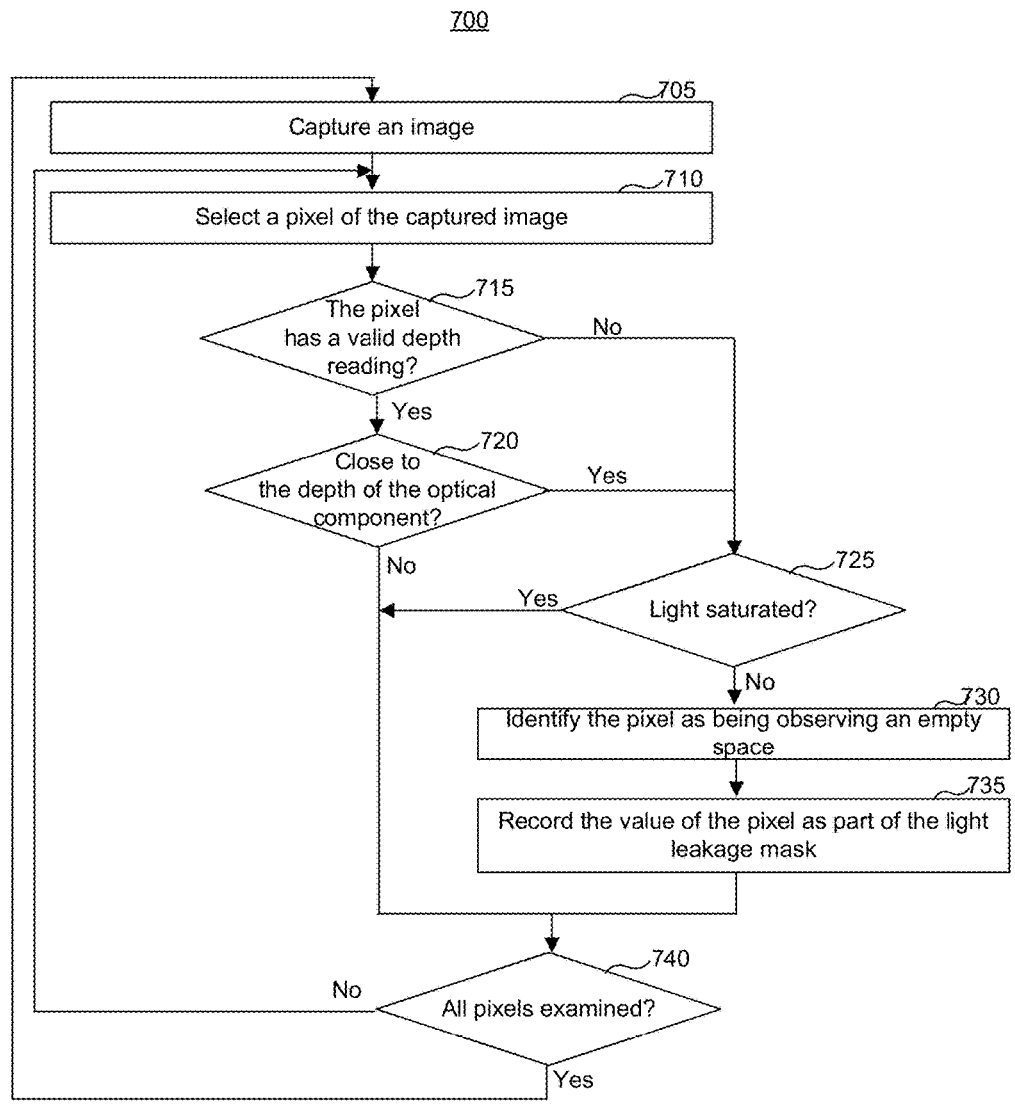
FIG. 7 is a flow diagram illustrating another sample process of generating a light leakage mask on-the-fly.

FIG. 7 illustrates another sample process of generating a light leakage mask on-the-fly. The process 700 is not based on the assumption that each pixel observes empty space for certain amount of time. Instead, the process 700 actively tries to detect empty space observations based on one or more constraints. At step 705 of the process 700, the depth camera of the depth sensing device captures an image. At step 710, the depth sensing device selects a pixel of the captured image.

At step 715, the depth sensing device determines whether the selected pixel has a valid depth reading. A valid depth reading refers to a depth reading that is within the hardware limit of the camera pixel. If the pixel has a valid depth reading, the process 700 proceeds to step 720. If the pixel does not have a valid depth reading, this suggests that the pixel may observe an empty space and the process 700 proceeds to step 725.

At step 720, the depth sensing device determines whether the valid depth reading is close to the depth of the optical component (e.g., visor). The depth of the optical component refers to the distance between the optical component and the depth camera. The closeness can be determined based on a threshold value. If a difference between the pixel depth reading and the depth of the optical component is less than the threshold value, the depth reading is determined to be close to the depth of the optical component. Such a close depth reading also suggests that the pixel may observe an empty space. If so, the process 700 proceeds to step 725. Otherwise the process 700 proceeds to step 740.

At step 725, the depth sensing device determines whether the signal is saturated on the pixel of the sensor. For example, the signal is saturated if the received light signal is significantly above a leakage expectation (based on, e.g., a threshold value). If the signal is saturated, the process 700 proceeds to step 740. If the signal is not saturated, the process 700 proceeds to step 730, wherein the depth sensing device identifies the pixel as being observing an empty space. At step 735, the depth sensing device records the value of the pixel as part of the light leakage mask. Then the process 700 proceeds to step 740.

At step 740, the depth sensing device determines whether all pixels are examined. If so, the process 700 proceeds to step 705 to capture another image. Otherwise, the process 700 proceeds to step 710 to select another pixel for examination.

The process 700 illustrates constraints for detecting empty space observation and pixel depth reading for the light leakage mask, such as depth reading validness (at step 715), closeness to optical component (at step 720), and signal saturation (at step 725). In some other embodiments, the depth sensing device can identify pixel values for the light leakage mask based on other constraints.

Figure 8:
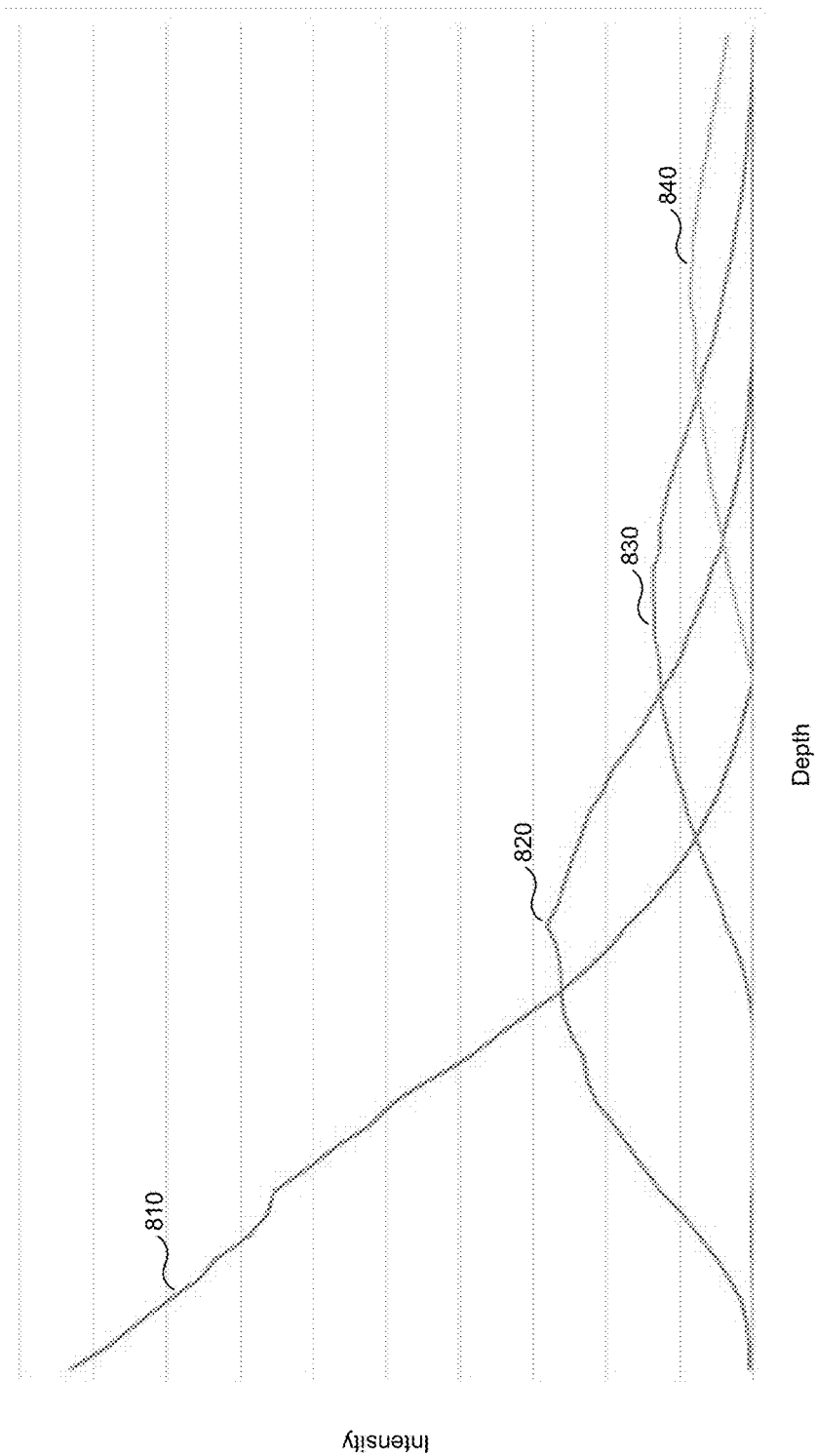
FIG. 8 shows intensities observed in four shutter images.

For example, if depth sensing device is a pulse-based ToF depth camera, the depth sensing device can examine shutter images that not subject to light leakage as a criterion to determine whether a pixel observes an empty space. Multiple shutter images are available to the pulse-based ToF depth camera because the shutter can be opened and closed for multiple times since a point in time when the illumination module emits a light signal. The time periods when the shutter opens are called shutter windows. By adjusting the opening and closing times of the shutter, the depth camera records multiple shutter images at different time windows. FIG. 8 shows intensities observed in four shutter images. The readings from the multiple images are used to eliminate effects of unknown variables such as environment reflectivity and ambient light intensity, and to provide robustness against multi-path interference.

As shown in FIG. 8, unlike the 1st shutter window 810, the opening times of the 2nd, 3rd and 4th shutter windows (820, 830, 840) are after the time point when the emitted light travels for 628 mm and then reaches the depth camera. Due to the short distance between the optical component (e.g., visor) and the depth camera (which is significantly less than 628 mm), the leaked light has already reached the depth camera before the 2nd, 3rd and 4th shutter windows (820, 830, 840). In other words, the 2nd, 3rd and 4th shutter images are not subject to light leakage due to the light redirection of the optical component. If the corresponding pixel of any of the 2nd, 3rd and 4th shutter images contains light signals, the depth sensing device can determine that that pixel is not observing an empty space.

In some embodiments, the depth sensing device can use a machine learning process to train a classifier based on a training set with verified classification data for determining whether a pixel of a captured image observes an empty space and qualifies as part of the light leakage mask. For example, such a machine learning classifier can be based on, e.g., neural networks or random decision forests.

Reduction of Depth Error by Controlling Shutter

Instead of using a light leakage mask, the depth sensing device can also control the shutter operation to block light signals (i.e., photon) that are redirected by the optical component (e.g., visor). Particularly for a pulse-based ToF depth camera, the system can adjust the opening and closing time points of shutter windows of the shutter such that no light signals that travel for less than a threshold value reach the depth camera during any of the shutter windows. If the threshold value exceeds or equals a distance for which the leaked light travels from the illumination module to the optical component and then reaches the depth camera, the depth camera captures no leaked light that causes the depth error.

Figure 9B:
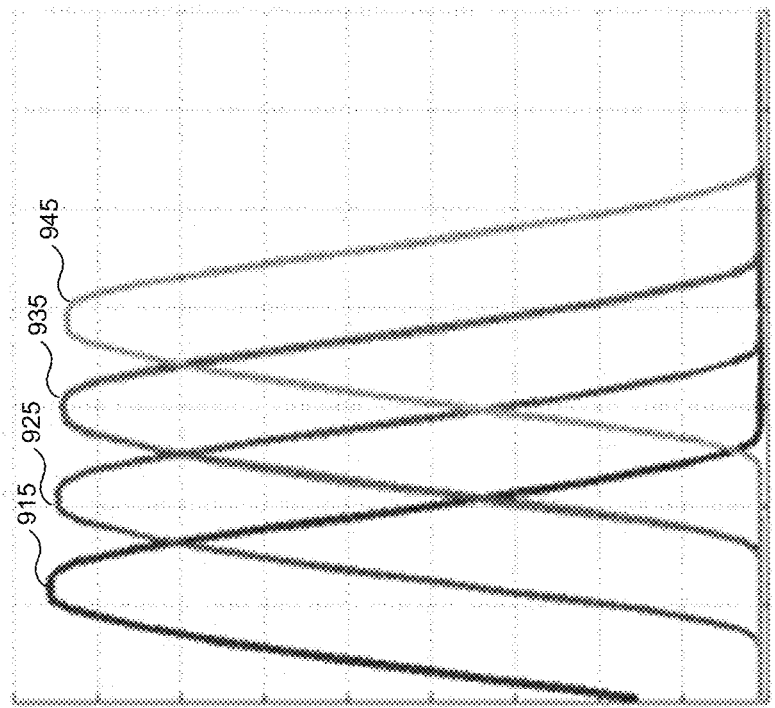
FIG. 9B shows shutter windows of a pulse-based ToF depth camera that are adjusted to avoid capturing leaked light.
Figure 9A:
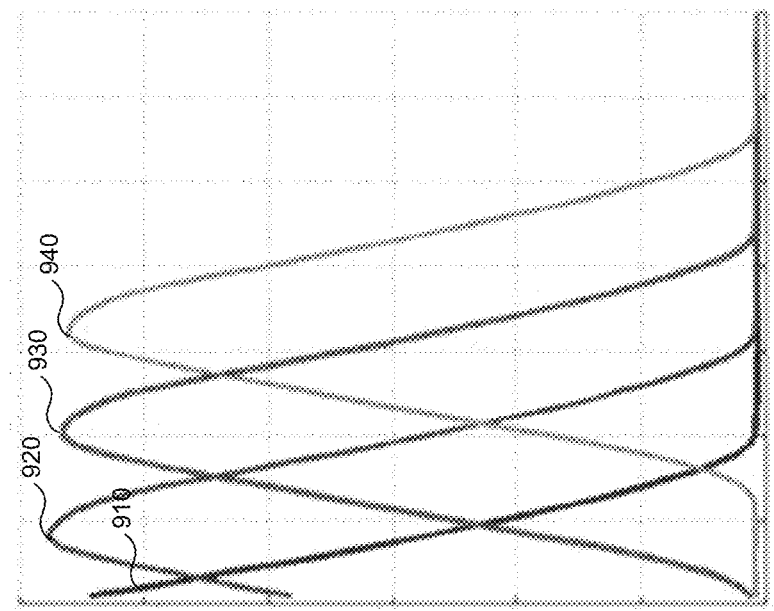
FIG. 9A shows shutter windows of a pulse-based ToF depth camera that are not adjusted to avoid capturing leaked light.

FIG. 9A shows shutter windows of a pulse-based ToF depth camera that are not adjusted to avoid capturing leaked light. The Y-axis represents the light intensities of the shutter images captured during the shutter windows. The X-axis represents the corresponding depth readings. Assuming the depth of the optical component (e.g., visor) is 5 cm, the shutter images 910 and 920 collect a large number of photons around the depth of the optical component. Therefore, the depth readings based on the shutter images 910, 920, 930 and 940 are heavily affected by the leaked light due to the optical component.

Figure 10:
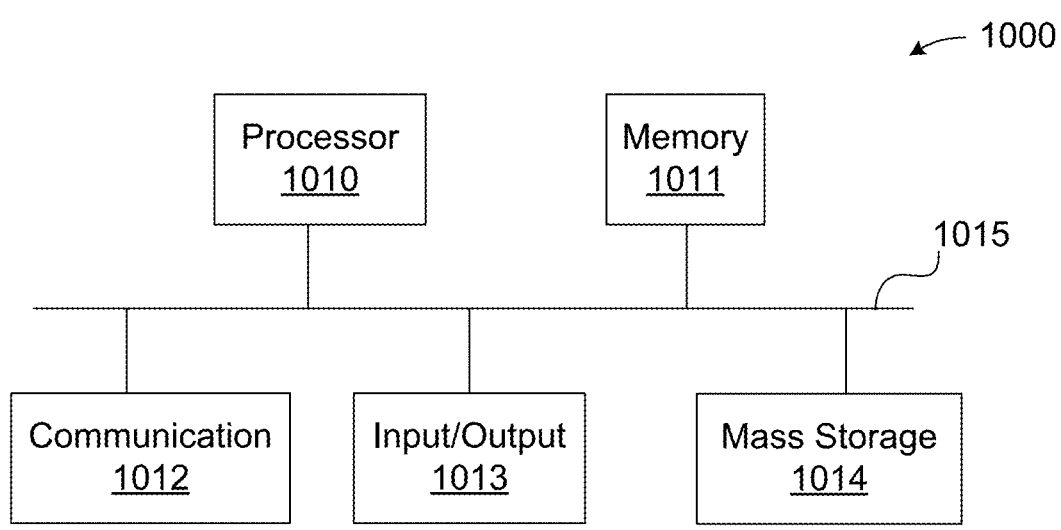
FIG. 10 shows a high-level example of a hardware architecture of a system that can be used to implement any one or more of the functional components described herein.

FIG. 9B shows shutter windows of a pulse-based ToF depth camera that are adjusted to avoid capturing leaked light. As illustrated in FIG. 9B, a substantially reduced number of photons are collected around the close depth of the optical component by the shutter images 925, 935 and 945. Even the shutter image 915 only collects a small number of photons around the depth of the optical component. Thus, the light leakage contamination is significantly reduced. Therefore, the depth sensing device can reduce or eliminate the depth error by controlling the shutter windows. The leaked light can be avoided if no photons or a small number of photons at the depth of the optical component is collected by the shutter images. Such a controlling of the shutter operation can be applied to avoid light leakage due to manufacturing imperfections of the protective optical component, as well as foreign objects (e.g., a smudge or fingerprint) on the optical component, Sample Hardware Architecture FIG. 10 shows a high-level example of a hardware architecture of a processing system that can be used to implement the disclosed functions. The processing system illustrated in FIG. 10 can be, e.g., a subsystem of the HMD device, the NED device or other depth sensing devices. One or multiple instances of an architecture such as shown in FIG. 10 (e.g., multiple computers) can be used to implement the techniques described herein, where multiple such instances can be coupled to each other via one or more networks.

The illustrated processing system 1000 includes one or more processors 1010, one or more memories 1011, one or more communication device(s) 1012, one or more input/output (I/O) devices 1013, and one or more mass storage devices 1014, all coupled to each other through an interconnect 1015. The interconnect 1015 may be or include one or more conductive traces, buses, point-to-point connections, controllers, adapters and/or other conventional connection devices. Each processor 1010 controls, at least in part, the overall operation of the processing device 1000 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 1011 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 1014 can be or include one or more hard drives, digital versatile disks (DVDs), flash memories, or the like. Each memory 1011 and/or mass storage 1014 can store (individually or collectively) data and instructions that configure the processor(s) 1010 to execute operations to implement the techniques described above. Each communication device 1012 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 1000, each I/O device 1013 can be or include a device such as a display (which may be a touch screen display), audio speaker, keyboard, mouse or other pointing device, microphone, camera, etc. Note, however, that such I/O devices may be unnecessary if the processing device 1000 is embodied solely as a server computer.

In the case of a user device, a communication device 1012 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 1012 can be or include, for example, any of the aforementioned types of communication devices, a wired Ethernet adapter, cable modem, DSL modem, or the like, or a combination of such devices.

The machine-implemented operations described above can be implemented at least partially by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the embodiments introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Examples of Certain Embodiments

Certain embodiments of the technology introduced herein are summarized in the following numbered examples:

1. An method of depth sensing including: emitting light, by a light emitter, to illuminate an environment of a depth sensing device; identifying a first portion of the emitted light that is prevented from reaching the environment of the depth sensing device due to being redirected by an optical component located in proximity to the light emitter; detecting, by an imaging sensor of the depth sensing device, a second portion of the emitted light that reaches and is reflected by a surface in the environment of the depth sensing device other than a surface of the optical component; and generating, based on the second portion of the emitted light, a depth map that includes a plurality of pixel values corresponding to distances relative to the depth sensing device, wherein said generating excludes from consideration the identified first portion of the emitted light.

2. The method of example 1, further including: generating a light leakage mask including pixel values corresponding to the first portion of the emitted light that is prevented from reaching the environment of the depth sensing device due to being redirected by the optical component, wherein the light leakage mask improves an accuracy of the depth map; and detecting an object in the environment of the depth sensing device based on the depth map.

3. The method of example 2, wherein said generating of the depth map includes: recording, by the imaging sensor, an image based on the detected light; generating a processed image by subtracting the light leakage mask from the recorded image; and converting the processed image to the depth map that includes the pixel values corresponding to depths of the environment relative to the depth sensing device.

4. The method of example 3, wherein the light emitted by the light emitter includes a pulse of light, and wherein said converting includes converting a pixel value of the depth map based on a time of flight from the light emitter to the environment and then to the imaging sensor.

5. The method of example 3 or 4, wherein the light emitted by the light emitter is frequency-modulated, and wherein said converting includes converting a pixel value of the depth map based on a phase difference between the light emitted by the light emitter and the light detected by the imaging sensor.

6. The method in any of the preceding examples 3 through 5, wherein the light emitted by the light emitter has a structured light pattern, and wherein said converting includes converting a pixel value of the depth map by stereo matching between the processed image and a virtual image that corresponds to the structured light pattern.

7. The method in any of the preceding examples 1 through 6, wherein the first portion of the emitted light is redirected by a foreign object on the optical component or due to a manufacturing imperfection of the optical component.

8. The method in any of the preceding examples 1 through 7, further including: performing a calibrating process by the depth sensing device facing an empty space; and generating the light leakage mask including pixel values corresponding to light that is redirected by the optical component and reaches the depth camera.

9. The method in any of the preceding examples 1 through 8, further including: identifying a pixel that observes an empty space when the depth sensing device is in operation; and generating the light leakage mask including a pixel value of the identified pixel.

10. The method in any of the preceding examples 1 through 9, further including: closing a shutter of the imaging sensor during a first time period when the first portion of the emitted light redirected by the optical component is reaching the shutter; and opening the shutter during a second time period when the imaging sensor receives through the optical component the second portion of the emitted light reflected by the surface in the environment.

11. A depth sensing device including: an illumination module that, when in operation, emits light, wherein a first portion of the emitted light illuminates an environment of the depth sensing device; an optical component located in proximity to the illumination module, wherein the optical component redirects and prevents a second portion of the emitted light from reaching the environment of the depth sensing device; an imaging sensor that, when in operation, receives the first and second portions of the emitted light and records an image based on the received light; and a processor that, when in operation, generates a processed image by subtracting a light leakage mask from the recorded image, the light leakage mask including pixel values corresponding to the second portion of the emitted light that is prevented from reaching the environment of the depth sensing device due to being redirected by the optical component, and converts the processed image into a depth map that includes a plurality of pixel values corresponding to depths of the environment relative to the depth sensing device.

12. The depth sensing device of example 11, wherein the depth sensing device performs a calibration process when the depth sensing device faces an empty space, and the processor generates the light leakage mask during the calibration process.

13. The depth sensing device of example 11 or 12, wherein the processor, when in operation, identifies a pixel that observes an empty space when the depth sensing device is in operation, and generates the light leakage mask including a pixel value of the identified pixel.

14. The depth sensing device in any of the preceding examples 11 through 13, wherein the imaging sensor, when in operation, records multiple images; and wherein the processor, when in operation, identifies a percentage of the images that have the lowest captured intensity values for an individual pixel, and generates a pixel value of the light leakage mask by calculating an average value of the identified lowest captured intensity values for the individual pixel.

15. The depth sensing device in any of the preceding examples 11 through 14, wherein the processor, when in operation, identifies a pixel that does not have a valid depth reading or has a depth reading that is close to a depth of the optical component within a threshold value, and generates the light leakage mask including a pixel value of the identified pixel.

16. The depth sensing device of example 15, wherein the light is not saturated at the identified pixel of the imaging sensor.

17. The depth sensing device of example 15 or 16, wherein the identified pixel of a shutter image that is not subject to light leakage does not contain a light signal.

18. A depth sensing device including: an optical component; an illumination module located in proximity to the optical component, when in operation, emits light towards an environment of the depth sensing device, wherein a first portion of the emitted light is prevented from reaching the environment due to being redirected by the optical component, and a second portion of the emitted light illuminates the environment and is reflected through the optical component by a surface in the environment other than a surface of the optical component; and an imagining sensor including a shutter, wherein the shutter, when in operation, closes during a first time period when the first portion of the emitted light redirected by the optical component is reaching the shutter, and the shutter, when in operation, opens during a second time period when the imaging sensor receives through the optical component the second portion of the emitted light reflected by the surface of the environment.

19. The depth sensing device of example 18, wherein opening and closing operations of the shutter are controlled to prevent the imaging sensor from receiving the first portion of the emitted light that is prevented from reaching the environment due to being redirected by the optical component.

20. The depth sensing device of example 18 or 19, wherein there are multiple shutter windows since the illumination module emits a pulse of light, and a first shutter window among the multiple shutter windows opens after the pulse of light reaches the imaging sensor.

21. An apparatus of depth sensing including: means for emitting light, by a light emitter, to illuminate an environment of a depth sensing device; means for identifying a first portion of the emitted light that is prevented from reaching the environment of the depth sensing device due to being redirected by an optical component located in proximity to the light emitter; means for detecting, by an imaging sensor of the depth sensing device, a second portion of the emitted light that reaches and is reflected by a surface in the environment of the depth sensing device other than a surface of the optical component; and means for generating, based on the second portion of the emitted light, a depth map that includes a plurality of pixel values corresponding to distances relative to the depth sensing device, wherein said generating excludes from consideration the identified first portion of the emitted light.

22. The apparatus of example 21, further including: means for generating a light leakage mask including pixel values corresponding to the first portion of the emitted light that is prevented from reaching the environment of the depth sensing device due to being redirected by the optical component, wherein the light leakage mask improves an accuracy of the depth map; and means for detecting an object in the environment of the depth sensing device based on the depth map.

23. The apparatus of example 22, wherein said generating of the depth map includes: means for recording, by the imaging sensor, an image based on the detected light; means for generating a processed image by subtracting the light leakage mask from the recorded image; and means for converting the processed image to the depth map that includes the pixel values corresponding to depths of the environment relative to the depth sensing device.

24. The apparatus of example 23, wherein the light emitted by the light emitter includes a pulse of light, and wherein said converting includes converting a pixel value of the depth map based on a time of flight from the light emitter to the environment and then to the imaging sensor.

25. The apparatus of example 23 or 24, wherein the light emitted by the light emitter is frequency-modulated, and wherein said converting includes converting a pixel value of the depth map based on a phase difference between the light emitted by the light emitter and the light detected by the imaging sensor.

26. The apparatus in any of the preceding examples 3 through 5, wherein the light emitted by the light emitter has a structured light pattern, and wherein said converting includes converting a pixel value of the depth map by stereo matching between the processed image and a virtual image that corresponds to the structured light pattern.

27. The apparatus in any of the preceding examples 21 through 26, wherein the first portion of the emitted light is redirected by a foreign object on the optical component or due to a manufacturing imperfection of the optical component.

28. The apparatus in any of the preceding examples 21 through 27, further including: means for performing a calibrating process by the depth sensing device facing an empty space; and means for generating the light leakage mask including pixel values corresponding light that is redirected by the optical component and reaches the depth camera.

29. The apparatus in any of the preceding examples 21 through 28, further including: means for identifying a pixel that observes an empty space when the depth sensing device is in operation; and means for generating the light leakage mask including a pixel value of the identified pixel.

30. The apparatus in any of the preceding examples 21 through 29, further including: means for closing a shutter of the imaging sensor during a first time period when the first portion of the emitted light redirected by the optical component is reaching the shutter; and means for opening the shutter during a second time period when the imaging sensor receives through the optical component the second portion of the emitted light reflected by the surface in the environment.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:
1. A method of depth sensing, comprising:
emitting light, by a light emitter, to illuminate an environment of a depth sensing device;
identifying a first portion of the emitted light that is prevented from reaching the environment of the depth sensing device due to being redirected by a visor of an optical component located in proximity to the light emitter;

detecting, by an imaging sensor of the depth sensing device, a second portion of the emitted light that reaches and is reflected by a surface in the environment of the depth sensing device other than a surface of the optical component; and generating, based on the second portion of the emitted light, a depth map that includes a plurality of pixel values corresponding to distances between the environment and the depth sensing device without any depth error caused by deviations due to the first portion of the emitted light, wherein the generating excludes from consideration the identified first portion of the emitted light.

2. The method of claim 1, further comprising:
generating a light leakage mask including pixel values corresponding to the first portion of the emitted light that is prevented from reaching the environment of the depth sensing device due to being redirected by the optical component, wherein the light leakage mask improves an accuracy of the depth map; and
detecting an object in the environment of the depth sensing device based on the depth map.

3. The method of claim 2, wherein said generating of the depth map includes:
recording, by the imaging sensor, an image based on the detected light;
generating a processed image by subtracting the light leakage mask from the recorded image; and
converting the processed image to the depth map that includes the pixel values corresponding to depths of the environment relative to the depth sensing device.

4. The method of claim 3, wherein the light emitted by the light emitter includes a pulse of light, and wherein said converting includes converting a pixel value of the depth map based on a time of flight from the light emitter to the environment and then to the imaging sensor.

5. The method of claim 3, wherein the light emitted by the light emitter is frequency-modulated, and wherein said converting includes converting a pixel value of the depth map based on a phase difference between the light emitted by the light emitter and the light detected by the imaging sensor.

6. The method of claim 3, wherein the light emitted by the light emitter has a structured light pattern, and wherein said converting includes converting a pixel value of the depth map by stereo matching between the processed image and a virtual image that corresponds to the structured light pattern.

7. The method of claim 1, wherein the first portion of the emitted light is redirected by a foreign object on the optical component or due to a manufacturing imperfection of the optical component.

8. The method of claim 1, further comprising:
performing a calibrating process by the depth sensing device facing an empty space; and
generating the light leakage mask including pixel values corresponding light that is redirected by the optical component and reaches the depth camera.

9. The method of claim 1, further comprising:
identifying a pixel that observes an empty space when the depth sensing device is in operation; and
generating the light leakage mask including a pixel value of the identified pixel.

10. The method of claim 1, further comprising:
closing a shutter of the imaging sensor during a first time period when the first portion of the emitted light redirected by the optical component is reaching the shutter; and opening the shutter during a second time period when the imaging sensor receives through the optical component the second portion of the emitted light reflected by the surface in the environment.

11. A depth sensing device comprising:
an illumination module having a lighting device that, when in operation, emits light, wherein a first portion of the emitted light illuminates an environment of the depth sensing device;
an optical component located in proximity to the illumination module, wherein the optical component including a visor that redirects and prevents a second portion of the emitted light from reaching the environment of the depth sensing device;
an imaging sensor that, when in operation, receives the first and second portions of the emitted light and records an image based on the received light; and
a processor that, when in operation, generates a processed image by subtracting a light leakage mask from the recorded image, the light leakage mask including pixel values corresponding to the second portion of the emitted light that is prevented from reaching the environment of the depth sensing device due to being redirected by the optical component, and converts the processed image into a depth map that includes a plurality of pixel values corresponding to distances between the environment and the depth sensing device without any depth error caused by deviations due to the second portion of the emitted light.

12. The depth sensing device of claim 11, wherein the depth sensing device performs a calibration process when the depth sensing device faces an empty space, and the processor generates the light leakage mask during the calibration process.

13. The depth sensing device of claim 11, wherein the processor, when in operation, identifies a pixel that observes an empty space when the depth sensing device is in operation, and generates the light leakage mask including a pixel value of the identified pixel.

14. The depth sensing device of claim 11, wherein the imaging sensor, when in operation, records multiple images; and
wherein the processor, when in operation, identifies a percentage of the images that have the lowest captured intensity values for an individual pixel, and generates a pixel value of the light leakage mask by calculating an average value of the identified lowest captured intensity values for the individual pixel.

15. The depth sensing device of claim 11, wherein the processor, when in operation, identifies a pixel that does not have a valid depth reading or has a depth reading that is close to a depth of the optical component within a threshold value, and generates the light leakage mask including a pixel value of the identified pixel.

16. The depth sensing device of claim 15, wherein the light is not saturated at the identified pixel of the imaging sensor.

17. The depth sensing device of claim 15, wherein the identified pixel of a shutter image is not subject to light leakage due to the optical component redirecting and preventing the second portion of the emitted light from reaching the environment of the depth sensing device.

18. A depth sensing device comprising:
an optical component including a visor;
an illumination module located in proximity to the optical component and having a lighting device that, when in operation, emits light towards an environment of the depth sensing device, wherein a first portion of the emitted light is prevented from reaching the environment due to being redirected by the visor of the optical component, and a second portion of the emitted light illuminates the environment and is reflected through the optical component by a surface in the environment other than a surface of the optical component;

an imaging sensor including a shutter, wherein the shutter, when in operation, closes during a first time period when the first portion of the emitted light redirected by the optical component is reaching the shutter, and the shutter, when in operation, opens during a second time period when the imaging sensor receives through the optical component the second portion of the emitted light reflected by the surface of the environment; and a processor, when in operation, generates a depth map that includes a plurality of pixel values corresponding to distances between the environment and the depth sensing device without any depth error caused by deviations due to the first portion of the emitted light.

19. The depth sensing device of claim 18, wherein opening and closing operations of the shutter are controlled to prevent the imaging sensor from receiving the first portion of the emitted light that is prevented from reaching the environment due to being redirected by the optical component.

20. The depth sensing device of claim 18, wherein there are multiple shutter windows since the illumination module emits a pulse of light, and a first shutter window among the multiple shutter windows opens after the pulse of light reaches the imaging sensor.

\* \* \* \* \*